United States Patent
Hendry et al.

(10) Patent No.: US 10,218,993 B2
(45) Date of Patent: *Feb. 26, 2019

(54) VIDEO ENCODING METHOD, VIDEO DECODING METHOD AND APPARATUS USING SAME

(71) Applicant: LG ELECTRONICS INC., Seoul (KR)

(72) Inventors: Hendry Hendry, Seoul (KR); Byeongmoon Jeon, Seoul (KR); Jungsun Kim, Seoul (KR); Sangoh Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,169

(22) Filed: Mar. 19, 2018

(65) Prior Publication Data

US 2018/0213245 A1 Jul. 26, 2018

Related U.S. Application Data

(63) Continuation of application No. 14/387,002, filed as application No. PCT/KR2013/002424 on Mar. 22, 2013, now Pat. No. 9,955,178.

(60) Provisional application No. 61/614,504, filed on Mar. 22, 2012.

(51) Int. Cl.
*H04N 19/436* (2014.01)
*H04N 19/174* (2014.01)
*H04N 19/70* (2014.01)
*H04N 19/44* (2014.01)

(52) U.S. Cl.
CPC .......... *H04N 19/44* (2014.11); *H04N 19/436* (2014.11); *H04N 19/70* (2014.11)

(58) Field of Classification Search
CPC .... H04N 19/436; H04N 19/13; H04N 19/174; H04N 19/61; H04N 7/00; H04N 19/00
See application file for complete search history.

(56) References Cited

U.S. PATENT DOCUMENTS

| | | |
|---|---|---|
| 2008/0002649 A1 | 1/2008 | Pengfei et al. |
| 2011/0274162 A1 | 11/2011 | Zhou et al. |
| 2012/0014429 A1 | 1/2012 | Zhao et al. |
| 2012/0014438 A1 | 1/2012 | Segall et al. |
| 2012/0189049 A1 | 7/2012 | Coban et al. |

(Continued)

FOREIGN PATENT DOCUMENTS

| | | |
|---|---|---|
| EP | 2381685 | 10/2011 |
| WO | 2012008608 | 1/2012 |

OTHER PUBLICATIONS

Coban et al., Unification of picture partitioning schemes, Joint Collaborative Team on Video Coding (JCT-VC) of ITU-T SG16 WP3 and ISO/IEC JTC1/SC29/WG11 7th Meeting: Geneva, CH, Nov. 21-30, 2011 Joint Collaborative Team on Video Coding (JCT-VC) Document: JCTVC-G315.

(Continued)

*Primary Examiner* — Dave Czekaj
*Assistant Examiner* — Alison Slater
(74) *Attorney, Agent, or Firm* — Dentons US LLP

(57) ABSTRACT

A video encoding method includes a step of encoding substreams which are rows of largest coding units (LCUs) in parallel with each other, and a step of transmitting a bit stream including the encoded substreams, where the number of the substreams may be the same as the number of entry points.

14 Claims, 13 Drawing Sheets

(56) References Cited

U.S. PATENT DOCUMENTS

2013/0182775 A1    7/2013  Wang et al.
2014/0016700 A1    1/2014  Henry et al.
2014/0334557 A1  11/2014  Schierl et al.
2014/0376643 A1  12/2014  Hendrry et al.

OTHER PUBLICATIONS

Wang et al, On parallel processing schemes Joint Collaborative Team on Video Coding (JCT-VC) of ITU-T SG16 WP3 and ISO/IEC JTC1/SC29/WG11 8th Meeting: San Jose, CA, USA, Feb. 1-10, 2012 Document: JCTVC-H0513r1.

Kiran Misra, Jie Zho, Andrew Segall, Lightweight slicing for entropy coding, Joint Collaborative Team on Video Coding (JCT-VC), of ITU-T SG16 WP3 and ISO/IEC JTC1/SC29/WG11, SHARP, Document: JCTVC-D070, WG11 No. m18820, Jan. 20-28, 2011, Camas, Washington.

□ : LCU(LTU)

| | $A_1$ | $A_2$ | $A_3$ | $A_4$ | $A_5$ | . . . . |
|---|---|---|---|---|---|---|
| 610 → | | | | | | |
| 620 → | $B_1$ | $B_2$ | $B_3$ | $B_4$ | $B_5$ | . . . . |
| 630 → | $C_1$ | $C_2$ | $C_3$ | $C_4$ | $C_5$ | . . . . |

$\boxed{X_x}$ xth LCU (CTU) of substream X

700

VIDEO ENCODING METHOD, VIDEO DECODING METHOD AND APPARATUS USING SAME

This application is a continuation of U.S. patent application Ser. No. 14/387,002, filed Sep. 22, 2014, which is a National Stage application of International Application No. PCT/KR2013/002424 filed Mar. 22, 2013, which claims the benefit of U.S. Provisional Application No. 61/614,504, filed Mar. 22, 2012, all of which are hereby incorporated by reference in their entirety for all purposes as if fully set forth herein.

TECHNICAL FIELD

The present invention relates to video encoding and decoding technologies, and more specifically, to technologies regarding parallel-decoding videos.

BACKGROUND ART

There is recent increasing demand for high-resolution, high-quality images in various applications. As the resolution and quality of images increase, the amount of information regarding the images also increases.

Accordingly, the storage of image information using existing storage media or transmission of image information using media such as existing broadband circuit lines lead to increasing transmission and storage costs.

High-efficiency video compression techniques may be used for effectively transmitting and storing high-resolution, high-quality image information.

To raise efficiency of image compression, inter prediction and intra prediction are available. The inter prediction predicts pixel values of the current picture by referring to information on other picture, and the intra prediction predicts the correlation between pixels in the same picture.

A variety of methods may apply to make an image the same as its original version for the processing unit of a predicted image, for example, a block. Through this, a decoding apparatus may more precisely decode the image (to be more consistent with the original version), and an encoding apparatus may encode the image to be restored more precisely.

DISCLOSURE

Technical Problem

The purpose of present invention is to provide a method and apparatus of configuring video information in order to effectively perform parallel decoding.

The purpose of present invention is to provide a substream structure to allow parallel decoding to be effective carried out.

The purpose of present invention is to provide a method and apparatus of perform parallel decoding efficiently corresponding to the various configuration of processing cores.

The purpose of present invention is to provide a method and apparatus of maximizing the number of substreams to allow for effective parallel decoding even when the number of processing cores is diversified.

Technical Solution

According to an embodiment of the present invention, a video decoding method comprises receiving a bit stream including substreams that are LCU (Largest Coding Unit) rows; and parallel decoding the substreams, in which the number of substreams may be the same as the number of LCU rows.

According to another embodiment of the present invention, a video encoding method comprises parallel encoding substreams that are LCU (Largest Coding Unit) rows; and transmitting a bit stream including the encoded substreams, in which the number of substreams may be the same as the number of the LCUs.

According to still another embodiment of the present invention, a video decoding apparatus parallel decoding a bit stream including substreams that are LCU (Largest Coding Unit) rows, in which the number of substreams may be the same as the number of entry points.

According to yet still another embodiment of the present invention, a video encoding apparatus parallel encoding substreams that are LCU (Largest Coding Unit) rows and transmitting a bit stream including the encoded substreams, in which the number of substreams may be the same as the number of entry points.

Advantageous Effects

According to the present invention, video information may be configured so that parallel decoding may be effectively conducted. For example, according to the present invention, the substream may be configured to allow for effective parallel decoding.

According to the present invention, parallel decoding may be effectively performed corresponding to the configuration of various processing cores. For example, according to the present invention, even when the number of processing cores is diversified, parallel decoding may be effectively carried out.

DESCRIPTION OF DRAWINGS

FIG. 6 is a view schematically illustrating a WPP substream.

MODE FOR INVENTION

Figure 1:
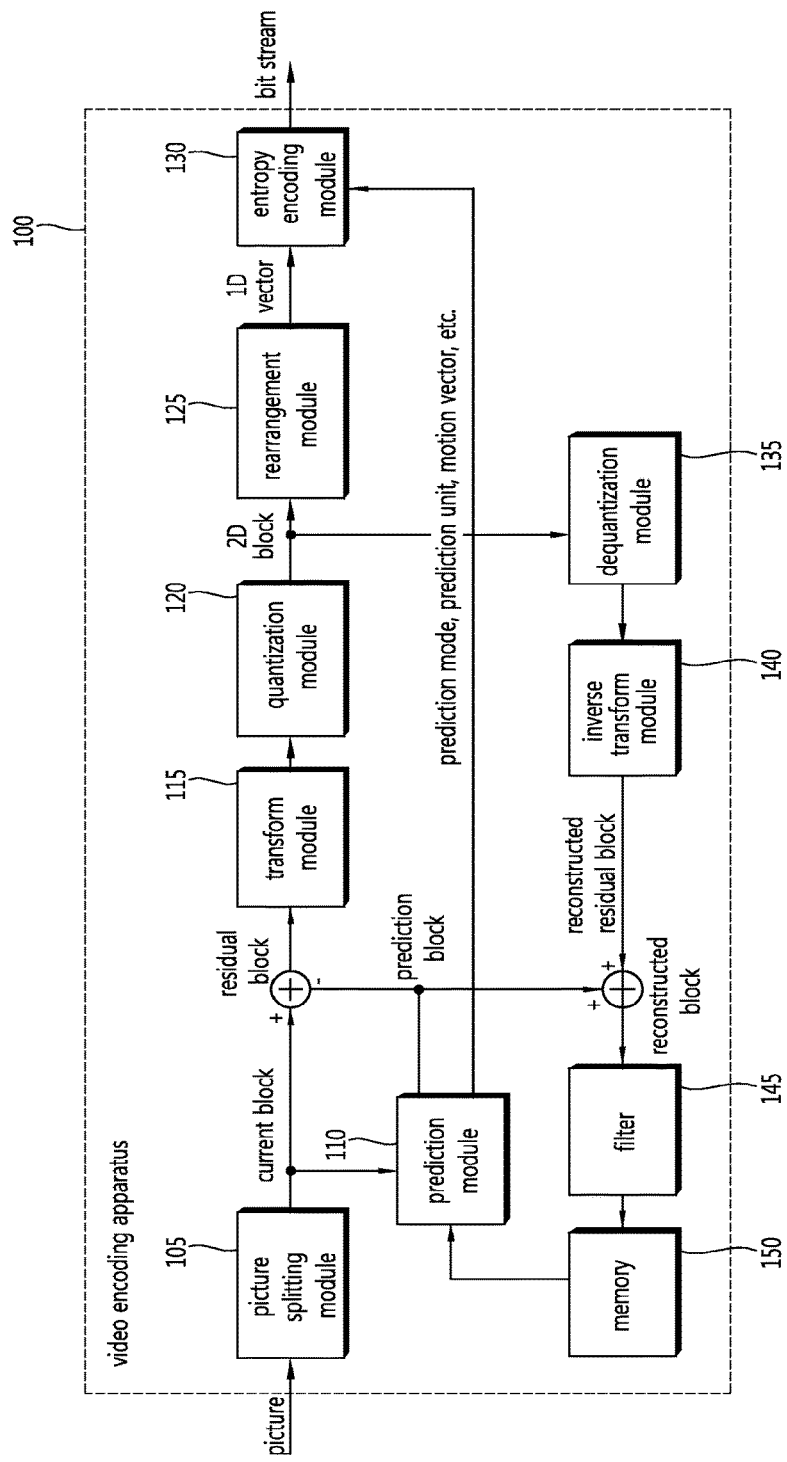
FIG. 1 is a block diagram schematically illustrating a video encoding apparatus according to an embodiment of the present invention.

Various changes may be made to the present invention, and the present invention may have various embodiments. Specific embodiments are described in detail with reference to the accompanying drawings. However, the present invention is not limited to the embodiments. The terms used herein are used for the illustrative purposes and are not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Meanwhile, the elements in the drawings are shown independently for ease of description on the different features from each other in the video encoding apparatus/decoding apparatus and should not be construed as meaning that the elements are implemented in separate pieces of hardware or software. For example, among the elements, two or more may be combined to configure a single element, and any one element may be divided into multiple elements. Embodiments where the elements are combined and/or each element is divided belong to the scope of the present invention without departing from the gist of the present invention.

Hereinafter, preferred embodiments of the present invention are described in detail with reference to the drawings. The same reference numerals refer to the same elements and the repetitive description on the same elements is omitted.

FIG. 1 is a block diagram system information a video encoding apparatus according to an embodiment of the present invention. Referring to FIG. 1, the encoding apparatus 100 includes a picture splitting module 105, a prediction module 110, a transform module 115, a quantization module 120, a rearrangement module 125, an entropy encoding module 130, a dequantization module 135, an inverse-transform module 140, a filter 145, and a memory 150.

The picture splitting module 105 may split an input picture into at least one process unit block. At this time, the block as a process unit may be a prediction unit (hereinafter, "PU") or may be a transform unit (hereinafter, "TU"), or a coding unit (hereinafter, "CU").

The process unit blocks split by the picture splitting module 105 may have the quad-tree structure.

The prediction module 110, as will be described below, includes an inter prediction module that performs inter prediction and an intra prediction module that performs intra prediction. The prediction module 110 performs prediction on the process unit of a picture in the picture splitting module 105 to generate a prediction block. The process unit of picture in the prediction module 110 may be a CU, TU, or PU. Further, the prediction module 110 may determine whether the prediction performed on the process unit is inter prediction or intra prediction and may determine details of each prediction method (for example, prediction mode, etc.). At this time, the process unit in which prediction is performed may differ from the process unit in which the prediction method and the details of prediction method are determined. For example, the prediction method and the prediction mode may be determined in units of PU, and prediction may be performed in units of TU.

Through inter prediction, prediction may be performed based on information on at least one picture of the previous picture and/or subsequent picture of the current picture, thus generating a prediction block. Further, through intra prediction, prediction may be performed on the pixel information in the current picture to generate a prediction block.

As the inter prediction method, skip mode, merge mode, and MVP (Motion Vector Prediction) may be used. The inter prediction may allow for selection of a reference picture on the PU and selection of a reference block corresponding to the PU. The reference block may be selected in units of integer pixels. Subsequently, a prediction block is generated by which a residual signal with the current PU is minimized and the size of motion vector is minimized.

The prediction block may be generated in units of integer samples, or in units of less-integer pixels such as units of ½ pixels or ¼ pixels. At this time, the motion vector may be represented in units of less integer pixels.

The information such as residual signal, motion vector (e.g., Motion Vector Predictor), or index of the reference picture selected through inter prediction is entropy-encoded and transferred to the decoding apparatus. In case skip mode applies, the residual may consider the prediction block as the reconstructed block, and thus, no residual may be generated, transformed, and transmitted.

In case intra prediction is performed, the prediction mode may be determined in units of PUs, and prediction may be performed in units of PUs. Further, the prediction mode may be determined in units of PUs, and intra prediction may be performed in units of TUs.

In the intra prediction, the prediction mode may include 33 directional prediction modes and at least two non-directional prediction modes. The non-directional prediction modes may include a DC prediction mode and a planar mode.

The intra prediction may apply a filter to a reference sample and may then generate a prediction block. At this time, whether to apply the filter to the reference sample may be determined depending on the size and/or intra prediction mode of the current block.

The PU may be a block having various sizes/shapes—for example, in the case of inter prediction, the PU may be 2N×2N blocks, 2N×N blocks, N×2N blocks, or N×N blocks (N is an integer). In the case of intra prediction, the PU may be 2N×2N blocks or N×N blocks (N is an integer). At this time, the PU whose size is N×N blocks may be set to be applied to only a particular case. For example, the N×N block-size PU may be set to be applied to only the minimum-size CU or to be used only for intra prediction. Further, besides the above-described PU sizes, the PU may be further defined to have sizes such as N×mN blocks, mN×N blocks, 2N×mN blocks, or mN×2N blocks (m<1).

The residual value (residual block or residual signal) between the generated prediction block and the original block is input to the transform module 115. Further, the motion vector information or prediction mode information used for prediction is encoded by the entropy coding module 130, together with the residual value, and is then transmitted delivered to the decoding apparatus.

The transform module 115 performs transformation on the residual block in units of transform blocks to generate a transform coefficient.

The transform block is a rectangular block of the samples and is applied with the same transformation. The transform block may be a transform unit (TU) and may have the quad tree structure.

The transform module 115 may perform transformation according to the prediction mode applied to the residual block and block size.

For example, in case intra prediction has applied to the residual block, and the block has a 4×4 residual array, the residual block is transformed using the DST (Discrete Sine Transform), and the residual block may be otherwise transformed using the DCT (Discrete Cosine Transform).

The transform module 115 may generate the transform block of the transform coefficients by transformation.

The quantization module 120 may quantize the residual values transformed by the transform module 115, i.e., the transform coefficients, to generate quantized transform coefficients. The values yielded from the quantization module 120 are provided to the dequantization module 135 and the rearrangement module 125.

The rearrangement module 125 rearranges the quantized transform coefficients provided from the quantization module 120. By rearranging the quantized transform coefficients, encoding efficiency of the entropy encoding module 130 may be increased.

The rearrangement module 125 may reorder the 2-dimensional block-type quantized transform coefficients into a 1-dimensional vector type.

The entropy coding module 130 may perform entropy coding on the quantized transform coefficients rearrangeed by the rearrangement module 125. As the entropy coding, encoding methods, such as Exponential Golomb, CAVLC (Context-Adaptive Variable Length Coding), CABAC(Context-Adaptive Binary Arithmetic Coding), may be used, for example. The entropy encoding module 130 may code various types of information including the quantized transform coefficient information and block type information of the CU delivered from the rearrangement module 125 and the prediction module 110, prediction mode information, splitting unit information, PU information and transmission unit information, motion vector information, reference picture information, interpolation information of block, or filtering information.

Further, the entropy encoding module 130, as necessary, may make a predetermined variation to the parameter set or syntax transmitted.

The dequantization module 135 dequantizes the values quantized by the quantization module 120 (quantized transform coefficients), and the inverse-transform module 140 inverse-transforms the values dequantized by the dequantization module 135.

The residual value generated by the dequantization module 135 and the inverse-transform module 140 and the prediction block predicted by the prediction module 110 may be mixed to generate a reconstructed block.

As per the description in connection with FIG. 1, the residual block and the prediction block are mixed by an adder to generate the reconstructed block. At this time, the adder may be deemed as a separate unit (reconstructed block generating unit) to generate the reconstructed block.

The filter 145 may apply a deblocking filter, ALF (Adaptive Loop Filter), and SAO (Sample Adaptive Offset) to the reconstructed picture.

The deblocking filter may eliminate the distortion that has been created at the boundary between blocks in the reconstructed picture. The ALF (Adaptive Loop Filter) may perform filtering based on the value obtained by comparing the original image with the image reconstructed after the block has been filtered by the deblocking filter. The ALF may also be performed only when high-efficiency applies. The SAO reconstructs the offset difference from the original image in units of pixels, on the residual block to which the deblocking filter has applied and is applied in the form of band offset or edge offset.

Meanwhile, the filter 145 might not apply filtering to the reconstructed block used for inter prediction.

The memory 150 may store the reconstructed block or picture yielded through the filter 145. The reconstructed block or picture stored in the memory 150 may be provided to the prediction module 110 that performs inter prediction.

Figure 2:
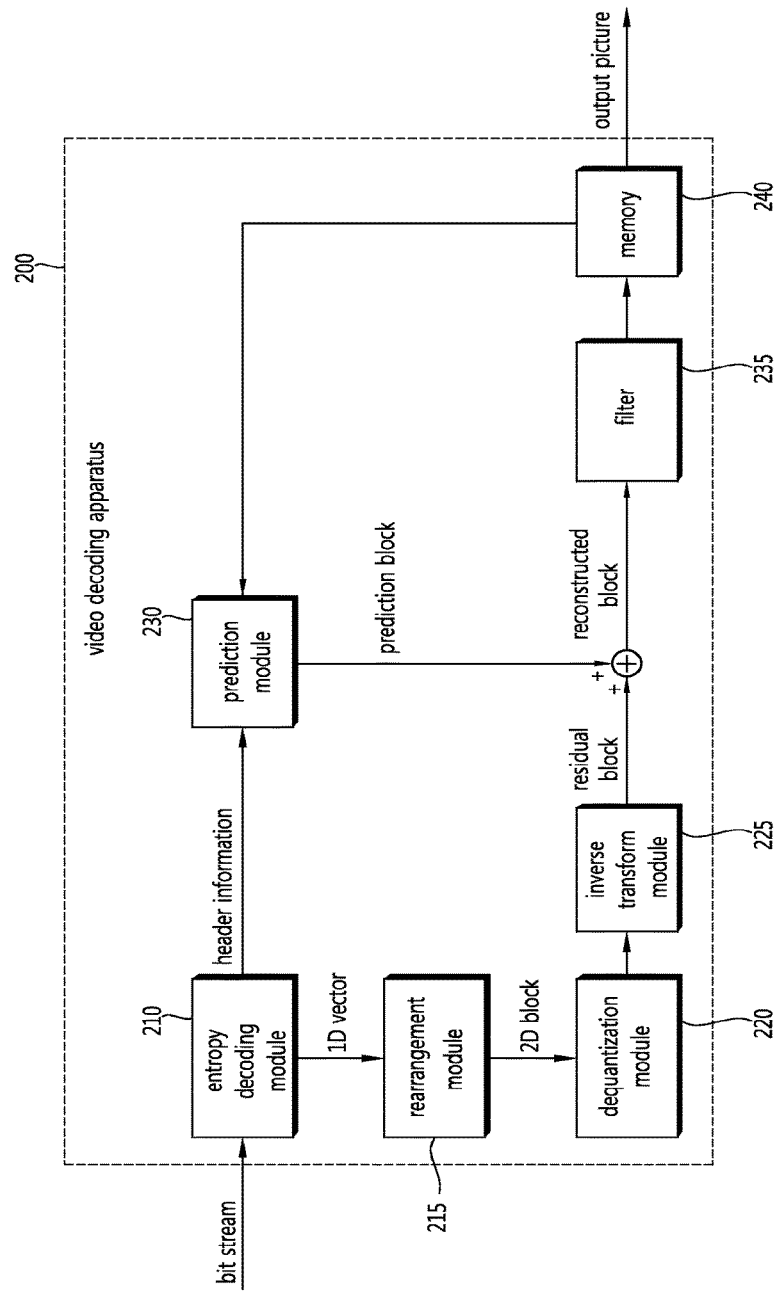
FIG. 2 is a block diagram schematically illustrating a video decoding apparatus according to an embodiment of the present invention.

FIG. 2 is a block diagram schematically illustrating a video decoding apparatus according to an embodiment of the present invention. Referring to FIG. 2, the video decoding apparatus 200 may include an entropy decoding module 210, a rearrangement module 215, a dequantization module 220, an inverse-transform module 225, a prediction module 230, a filter 235, and a memory 240.

In case an image bit stream is input from the video encoding apparatus, the input bit stream may be decoded as per the procedure in which the image information has been processed in the video encoding apparatus.

For example, in case variable length coding (hereinafter, "VLC") such as CAVLC has been used to perform entropy-encoding in the video encoding apparatus, the entropy decoding module 210 may perform entropy-decoding by implementing the same VLC table as the VLC table used in the encoding apparatus. Further, in case CABAC has been used to perform entropy-coding in the video encoding apparatus, the entropy decoding module 210 may perform entropy-decoding using CABAC corresponding to the same.

The information for generating a prediction block among the pieces of information decoded by the entropy decoding module 210 is provided to the prediction module 230, and the residual value obtained by performing entropy-decoding in the entropy decoding module 210, i.e., the quantized transform coefficient, may be input to the rearrangement module 215.

The rearrangement module 215 may reorder the bit stream information entropy-decoded in the entropy decoding module 210, i.e., the quantized transform coefficient, based on the reordering method used in the encoding apparatus.

The rearrangement module 215 may perform rearrangement by restoring the coefficients represented in the one-dimensional vector type into two-dimensional block types of coefficients. The rearrangement module 215 may generate a two-dimensional block-type coefficient (quantized transform coefficient) array by performing scanning on the coefficient based on the prediction mode adopted for the current block (transform block) and the size of transform block.

The dequantization module 220 may perform de-quantization based on the coefficient value of the reordered block and the quantization parameter provided from the encoding apparatus.

The inverse-transform module 225 may perform inverse DCT and/or inverse DST on the result of the quantization performed by the video encoding apparatus, corresponding to the DCT and DST that have been conducted by the transform module of the encoding apparatus. The inverse transform may be conducted in units of image splitting or in units of transmission determined by the encoding apparatus. The DCT and/or DST in the transform module of the encoding apparatus may be selectively conducted depending on a plurality of pieces of information such as the size of the current block and prediction direction and the prediction method, and the inverse-transform module 225 of the decoding apparatus may conduct inverse transform based on the information on the transformation performed in the transform module of the encoding apparatus.

The prediction module 230 may generate a prediction block based on the picture information and/or the previously decoded block provided from the memory 240 and the prediction block generation-related information provided from the entropy decoding module 210.

In case the prediction mode for the current PU is intra prediction mode, intra prediction may be conducted in which a prediction block is generated based on the pixel information in the current picture.

In case the prediction mode for the current PU is inter prediction mode, inter prediction may be performed for the current PU based on the information included in at least one picture of the previous picture or subsequent picture of the current picture. At this time, the motion information necessary for inter prediction of the current PU provided from the video encoding apparatus, for example, information regarding the motion vector or reference picture index may be induced corresponding to identifying the skip flag or merge flag received from the encoding apparatus.

The reconstructed block may be generated using the residual block provided from the inverse-transform module 225 and the prediction block generated by the prediction module 230. FIG. 2 shows an example in which the prediction block and the residual block are mixed in the adder to generate the reconstructed block. At this time, the adder may be considered as a separate unit (reconstructed block generating module) to generate the reconstructed block.

In case the skip mode applies, no residual is transmitted, and the prediction block may be used as the reconstructed block.

The reconstructed block and/or picture may be provided to the filter 235. The filter 235 may apply deblocking filtering, SAO (Sample Adaptive Offset) and/or ALF to the reconstructed block and/or picture.

The memory 240 may store the reconstructed block or picture to use the same as reference picture or reference block and may provide the reconstructed picture to an output unit.

Meanwhile, the encoding apparatus and the decoding apparatus may split the picture in predetermined units and process (encoding/decoding) the same.

For example, the picture may be split into a slice and a tile.

The slice is a sequence of one or more slice segments. The slice sequence includes dependent slice segments present starting an independent slice segment to a next independent slice segment.

The slice segment may be a sequence of coding tree units (CTU). The coding tree unit is a quad-tree structured coding unit and may be the largest coding unit (LCU). For better understanding, in this disclosure, the coding tree unit (hereinafter, "CTU") and the largest coding unit (hereinafter, "LCU") may be interchangeably used as necessary.

Figure 3:
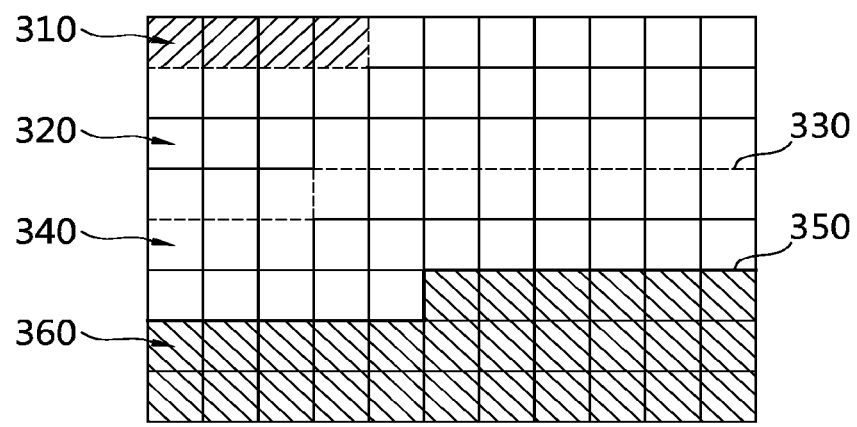
FIG. 3 is a view schematically illustrating an example slice.

FIG. 3 is a view schematically illustrating an example slice.

The current picture 300 is separated into two slices by a slice boundary 350. The first slice may consist of an independent slice segment 310 including four coding tree units, a first dependent slice segment 320 including 32 CTUs before and after the slice segment boundary 330 and a second dependent slice segment 340 including 24 CTUs.

Another independent slice segment 360 consists of 28 CTUs.

The tile may also be a CTU or LCU sequence. The CTU is a quad-tree structured coding unit and may be the LCU. As mentioned above, for better understanding in this disclosure, the CTU and the LCU may be interchangeably used as necessary.

Specifically, the tile may be an integer number of CTUs or LCUs that co-occur in a region that may be specified by one row and one column.

Figure 4:
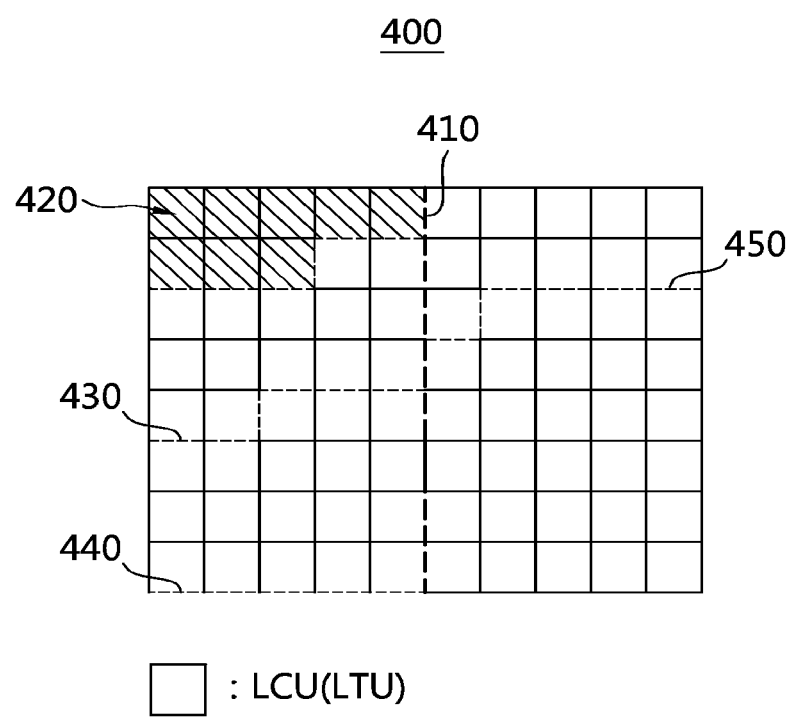
FIG. 4 is a view schematically illustrating an example tile and an example slice.

FIG. 4 is a view schematically illustrating an example tile and an example slice.

The current picture 400 includes only one slice and is divided into two tiles which are respectively positioned at the left side and right side of the tile boundary 410. The slice in the current picture 400 consists of an independent slice segment 420 and four dependent slice segments divided by the slice segment boundaries 430, 440, and 450.

Figure 5:
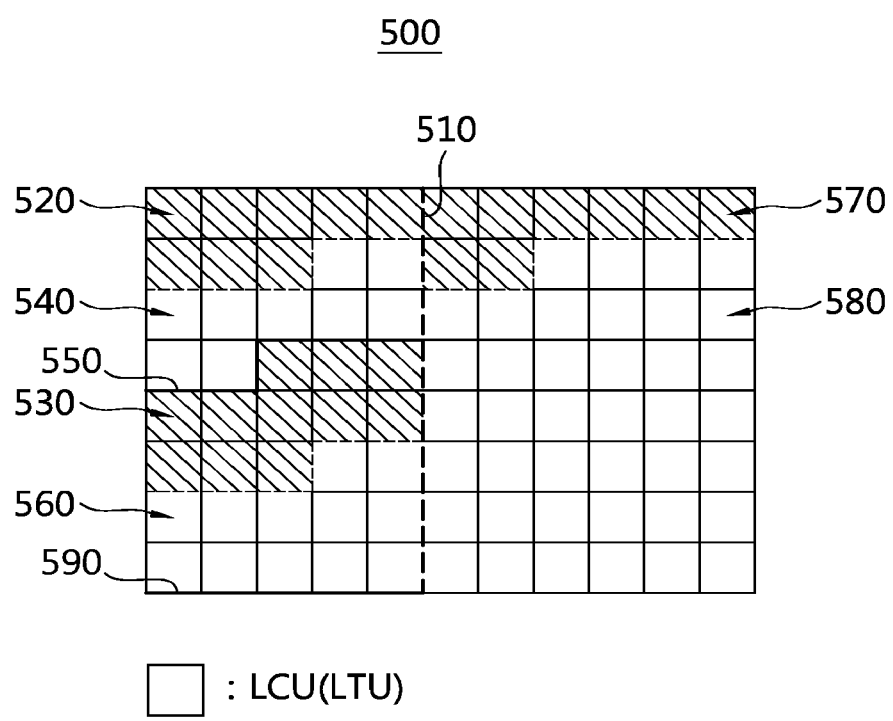
FIG. 5 is a view schematically illustrating another example tile and another example slice.

FIG. 5 is a view schematically illustrating another example tile and another example slice.

The current picture 500 is divided into two tiles which are relatively positioned at the left side and right side of the tile boundary 510. The left tile of the tile boundary 510 includes two slices with respect to the slice boundary 550. The slice over the slice boundary 550 includes an independent slice segment 520 and a dependent slice segment 540, and the slice under the slice boundary 550 includes an independent slice segment 530 and a dependent slice segment 560. The next slice with respect to the slice boundary 590, i.e., the slice in the second tile, includes an independent slice segment 530 and a dependent slice segment 580.

Encoding and decoding may be performed in units of tiles or in units of CTU rows (hereinafter, for ease of description, CTU row (or stream) or LCU row (or stream) is referred to as 'substream'). Each sample in the substream may be processed in units of CTUs or LCUs.

At this time, the decoding process may be performed in parallel. For example, the decoding process may be performed in parallel per tile or per substream.

In the case of parallel processing in the tile structure, each tile may be decoded simultaneously. At this time, the maximum number of tiles that may be parallel-processed may be pre-determined. For example, up to four tiles may be set to be parallel-processed. In case the number of tiles parallel-processable is four or less, the decoding apparatus may simultaneously process one to four tiles.

In case decoding is performed per substream, after decoding is performed on the nth (n is an integer) substream and then the second CTU or LCU in the nth substream is completely decoded, decoding on the n+1th substream may be carried out.

The substream is part of the bit stream that is subjected to decoding in each decoding process when a plurality of decoding processes are performed in parallel and may be a row of LCUs or CTUs.

If entropy-decoding on the second CTU (LCU) of the nth substream (nth CTU (LCU)) is complete, related context information is stored. The first CTU (LCU) of the n+1th substream may be entropy-decoded based on the context information on the second CTU (LCU) of the nth substream.

As such, each substream being parallel-parsed with a constant gap is referred to as WPP (Wavefront Parallel Processing). The CTU (LCU) may be parallel-processed in the slice or picture by the WPP.

The tile structure and WPP may allow the encoding apparatus to split a picture into a few portions. The split portions may be decoded in a parallel manner in the decoding apparatus.

The access point over the bit stream for performing parallel-decoding using the tile structure (tile substream) or WPP substream is referred to as entry point. For example, the entry point may be the start point of each WPP substream that is subject to parallel processing over the bit stream or the start point of each tile.

Accordingly, it is critical to signal the entry point of the WPP substream slice header or signal the entry point of each tile for parallel processing.

FIG. 6 is a view schematically illustrating a WPP substream.

In the example illustrated in FIG. 6, predetermined regions 600 in the picture include a plurality of substreams such as substream A 610, substream B 620, and substream C 630.

Each substream is sequentially decoded from the first LCU. The second or subsequent LCUs of each substream may be entropy-decoded based on the result of entropy-decoding the previous LCUs, i.e., the context.

In the case of WPP, each substream may be decoded in parallel, and the first LCUs in the next substreams to the first substream may be entropy-decoded based on the values of the context variables on the second LCU of the previous substream.

For example, in case decoding is performed in parallel by adopting the WPP, the decoding process is performed from the first LCU A1 of the first row 610 in the target decoding region 600. If entropy-decoding on the second LCU A2 of the first row 610 is complete, the decoding apparatus stores the values of the context variables for A2.

The first LCU B1 of the second row 620 is entropy-decoded based on the values of the context variables for the second LCU A2 of the first row 610. If entropy-decoding on the second LCU B2 of the second row 620 is complete, the decoding apparatus stores the values of the context variables for B2.

The first LCU C1 of the third row 630 is entropy-decoded based on the values of context values for the second LCU B2 of the second row 610. If entropy-decoding on the second LCU C2 of the third row 630 is complete, the decoding apparatus stores the values of the context values for B2.

In the same manner, entropy-decoding may be performed for the fourth row or subsequent rows using the values of context values for the second LCU of the immediately previous row.

In case the WPP applies, the entry point may indicate the start point (access point) of decoding for each substream.

In FIG. 6, the predetermined region 600 in the picture may be a partial region of the current picture, a slice of the current picture, or the entire region of the current picture.

As described above, in case the WPP applies, the region to which the WPP applies (for example, the entire picture or slice) may be divided into one or more substreams, the entry point may be signaled with the first bit of each substream in the slice header as the position for access.

Figure 7:
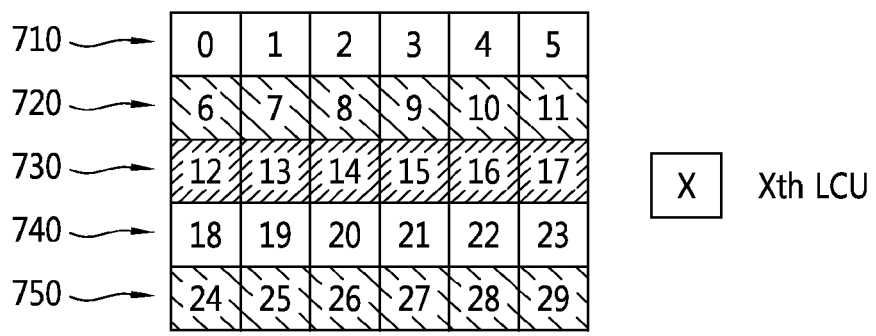
FIG. 7 is a schematically illustrating an example in which a predetermined region in a picture is split into substreams.

FIG. 7 is a view schematically illustrating an example in which a predetermined region in a picture is split into substreams.

FIG. 7 illustrates an example in which the predetermined region 700 in the picture is divided into three substreams such as substream 0 710 and 740, substream 1 720 and 750, and substream 2 730.

The first row 710 of substream 0 consists of a 0th LCU through a fifth LCU, and the second row 740 of substream 0 consists of an 18th LCU through a 23th LCU. The first row 720 of substream 1 consists of a sixth LCU through an 11th LCU, and the second row 750 of substream 1 consists of a 24th LCU through a 29th LCU. Further, substream 2 730 consists of a 12th LCU through a 17th LCU.

The substreams are transmitted in a predetermined sequence in the bit stream, and at this time, the access point in each subframe may be signaled to the entry point.

In case the WPP applies, if three processing cores perform decoding in parallel, the first processing core may decode substream 0, the second processing core may decode substream 1, and the third processing core may decode substream 2.

At this time, the first processing core may sequentially decode the first row 710 of substream 0 and then the second row 720. The second processing core may also decode the first row 720 of substream 1 and then the second row 740.

In FIG. 7, the predetermined region 700 in the picture may be the entire picture, a slice in the picture, a slice segment, or tile.

Figure 8:
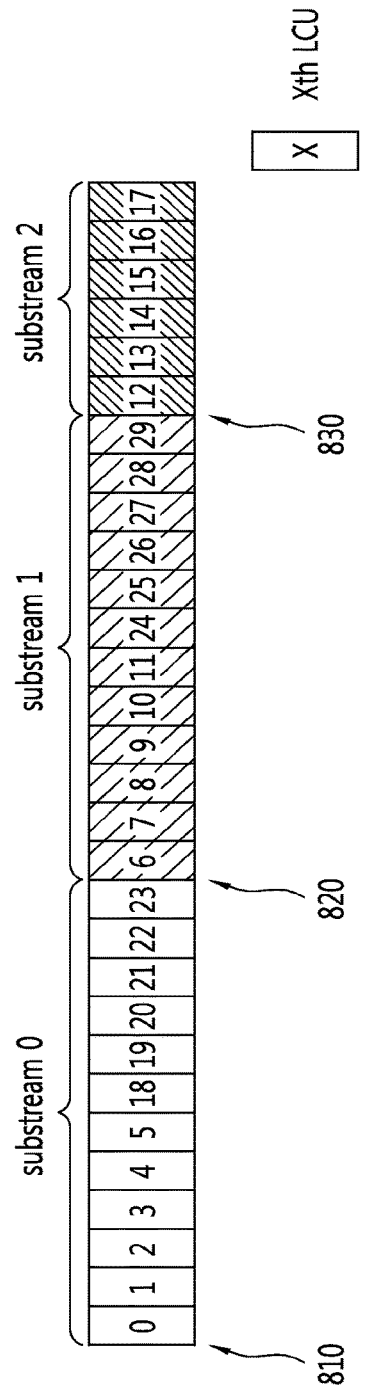
FIG. 8 is a view schematically illustrating an LCU order in a bit stream according to the example illustrated in FIG. 7.

FIG. 8 is a view schematically illustrating the LCU order in the bit stream according to the example shown in FIG. 7.

The LCUs may be rearranged per substream in the bit stream. The rearrangement of the LCUs may be performed in, e.g., the rearrangement module 125 of FIG. 1. For example, referring to FIG. 8, subsequent to substream 0, substream 1 and substream 2 are transmitted. The access point of substream 0 may be indicated by the entry point 810, the access point of substream 1 may be indicated by the entry point 820, and the access point of substream 2 may be indicated by the entry point 830.

As shown in FIG. 7, if the WPP is applied using three cores, the first processing core decodes substream 0, the second processing core decodes substream 1, and the third processing core decodes substream 2.

The first processing core decodes the 0th LCU through the fifth LCU, and then the 18th LCU through the 23th LCU. The second processing core decodes the sixth LCU through the 11th LCU, and then decodes the 24th LCU through the 29th LCU.

Meanwhile, as described above, the LCUs are reordered per substream in the bit stream as shown in FIG. 7. In case the number of decoders or processing cores is smaller than the substream, the complexity of decoding process may increase, or the decoding may be in trouble.

Figure 9:
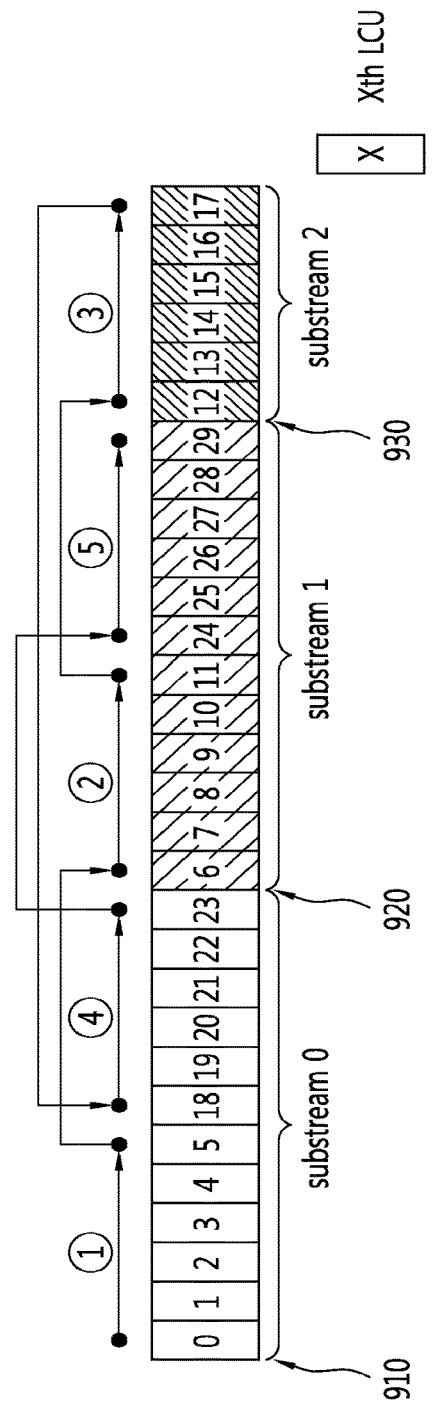
FIG. 9 is a view schematically illustrating an example in which the bit stream illustrated in FIG. 7 is decoded using one processing core.

FIG. 9 is a view schematically illustrating an example in which the bit stream according to the example shown in FIG. 7 is decoded using one processing core. Also in the example illustrated in FIG. 9, the reordering of LCUs may be conducted in, e.g., the rearrangement module 125 of FIG. 1.

In case the WPP is adopted to perform reordering on the LCUs as illustrated in FIG. 9, if decoding is performed using one processing core, the processing core first decodes the 0th LCU through the fifth LCU (①). Subsequently, the processing core decodes the sixth LCU through the 11th LCU (②) and then the 12th LCU through the 17th LCU (③). Then, the processing core shifts to the front of the bit stream to decode the 18th LCU through the 23th LCU (④) and the 24th LCU through the 29th LCU (⑤).

Accordingly, in case a single processing core is used, it shifts to the front or rear of the bit stream while performing decoding.

Further, during this course, the entry point indicating the access point, as shown, indicates the times 910, 920, and 930 of only the first LCUs in each substream. That is, although the processing core shifts frontward or rearward to access six points (0th LCU, sixth LCU, 12th LCU, 18th LCU, and 24th LCU), the entry point indicating the access points problematically sends only three.

Under the circumstance where the type and demand for image services are diversified, various types of decoding apparatuses (decoders) for performing video decoding may be available. In other words, the same video stream is in some cases decoded using a plurality of processing cores, while in other cases decoded using a single processing core.

Accordingly, the substream for WPP needs to be configured so that decoding may be fulfilled without increasing the complexity or causing trouble even when performed using a single processing core.

Hereinafter, a method of configuring a substream in case WPP applies according to the present invention is described in detail with reference to the drawings. According to the present invention, decoding, even when a single processing core is used, may be efficiently performed without increasing decoding complexity under the WPP.

Embodiment 1—Maximize the Number of Substreams in Case WPP Applies

In parallel decoding, maximizing the number of substreams each of which is the unit of decoding processing means that one LCU row in a picture becomes one substream.

In other words, according to this embodiment, the substreams are configured so that the number of substreams is equal to the number of LCU rows. If the number of substreams is the same as the number of LCU rows, the order of LCUs in the bit stream may be the order of raster scanning.

Figure 10:
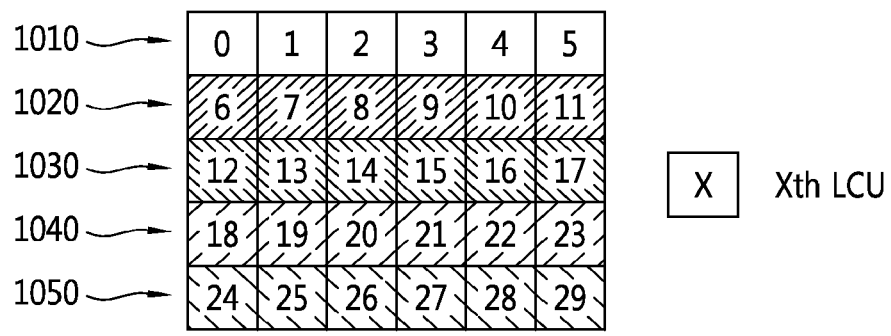
FIG. 10 is a view schematically illustrating an example in which each LCU row becomes a substream according to the present invention.

FIG. 10 is a view schematically illustrating an example in which each LCU row becomes each substream according to the present invention.

FIG. 10 illustrates an example in which a predetermined region 1000 in a picture consists of five LCU rows.

At this time, substream 0 1010 is the first LCU row consisting of the 0th LCU through the fifth LCU. Substream 1 1020 is the second LCU row consisting of the sixth LCU through the 11th LCU. Substream 2 1030 is the third LCU row consisting of the 12th LCU through the 17th LCU. Substream 3 1040 is the fourth LCU row consisting of the 18th LCU through the 23th LCU. Substream 4 1050 is the fifth LCU row consisting of the 24th LCU through the 29th LCU.

Accordingly, in the instant embodiment, each LCU row is one substream.

Meanwhile, in FIG. 10, the predetermined region 1000 in the picture may be the entire parameter, a slice in the picture, a slice segment or tile.

Figure 11:
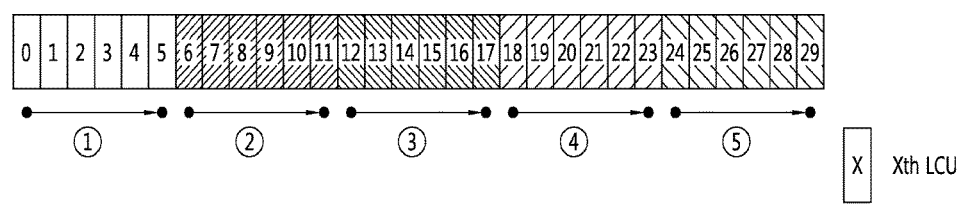
FIG. 11 is a view schematically illustrating LCUs in an ordered bit stream according to the present invention.

FIG. 11 is a view schematically illustrating LCUs in an ordered bit stream according to the present invention. FIG. 11 illustrates an example in which the substream according to FIG. 10 is reordered in the bit stream.

In the example illustrated in FIG. 11, if the WPP applies, the first substream, the second substream, the third substream, the fourth substream, and the fifth substream in the bit stream are ordered in the order thereof.

The processing core sequentially decodes the first substream (①), the second substream (②), the third substream (③), the fourth substream (④), and then the fifth substream (⑤).

In other words, if one LCU row is one substream according to the present invention, in case the WPP applies, the decoding apparatus may happen to sequentially decode the bit stream.

In case each LCU row is one substream, if the bit stream is byte-aligned, a padding bit for byte-basis alignment may be added to each LCU row, i.e., to each substream.

Meanwhile, maximizing the number of substreams may cause a predetermined change to the PPS (Picture Parameter Set) and slice header.

In the case of PPS, when the WPP applies, a predetermined syntax element may be signaled to specify the number of substreams. For example, the syntax element such as num_substream_minus1 may be transmitted to specify the number of substreams in the picture.

However, maximizing the number of substreams eliminates the need for transmission of information to indicate the number of substreams. Accordingly, no syntax element may be transmitted to specify the number of substreams. At this time, the number of substreams may be specified by the number of LCU rows or by the number of entry points.

For example, the number of substreams in the picture may be specified by the number of LCU rows in the picture or by the number of entry points in the picture. At this time, the number of entry points may be the number of entry point offsets+1. The number of entry point offsets may be signaled from the slice header.

As set forth above, in the slice header, the number of entry points may be signaled by the predetermined syntax element. The number of substreams in the slice may be the same as the number of entry points in the slice. Or, the number of substreams in the slice segment may be the same as the number of entry points in the slice segment.

At this time, rather than directly signaling the number of entry points, the number of entry point offsets may be signaled to specify the number of entry points.

For example, after the first entry point is signaled, the offset between the first entry point and the second entry point may be sent to specify the second entry point.

Subsequently, the third entry point may be specified by the second entry point and the offset between the second entry point and the third entry point.

As such, the nth entry point may be specified by its previous entry point and an offset, and the number of entry points may be specified by the number of offsets.

At this time, when the number of substreams is maximized, because the number of entry points is the same as the number of substreams, i.e., the number of LCU rows, the syntax element to specify the number of entry point offsets, i.e., the syntax element to indicate the number of entry points, need not be transmitted.

Or, the number of substreams (the number of LCU rows) may be specified through information that may specify the number of entry points, for example, the syntax element to specify the number of entry point offsets. For instance, assuming that the syntax element to specify the number of entry point offsets is num_entry_point_offset, when the number of entry point offsets specified by num_entry_point_offset is n, the number of entry points, i.e., the number of substreams and the number of LCU rows become n+1.

Table 1 shows an example slice header to signal the number of entry point offsets.

TABLE 1

| slice_header( ) { | Descriptor |
|---|---|
| .... | |
| if( tiles_or_entropy_coding_sync_idc!=0) { | |
| num_entry_point_offsets | ue(v) |
| .... | |

In Table 1, if tiles_or_entropy_coding_sync_idc is 1, parallel decoding applies per tile, and if tiles_or_entropy_coding_sync_idc is 2, the WPP applies, and if tiles_or_entropy_coding_sync_idc is 0, neither tile nor WPP applies.

In Table 1, in case the tile or WPP applies, the number of entry point offsets in the slice header may be transmitted. num_entry_point_offsets specifies the number of entry point offsets in the slice header, and the number of entry points in the slice header is the number of entry point offsets in the slice header+1.

Specifically, num_entry_point_offsets specifies the number of syntax elements entry_point_offset_minus1[i] in the slice header. When num_entry_point_offsets is void in the slice header, num_entry_point_offsets may be estimated as 0.

In case the picture has only one tile and the WPP applies, num_entry_point_offsets may be the CTB unit of a 0 or more picture height (i.e., the number of CTBs in the height direction of the picture, PicHeightInCtbs)−1 or less.

In case the picture has two or more tiles and the WPP does not apply, num_entry_point_offsets may be the number of tile rows not less than 0 (num_tile_coulmn_minus1+)*the number of tile rows (num_tile_row_minus1+1)−1 or less.

In case the picture has two or more tiles and the WPP applies, num_entry_point_offsets may be the number of tile rows not less than 0 (num_tile_coulmn_minus1+1)*CTB unit of picture height (i.e., the number of CTBs in the direction of picture height, PicHeightInCtbs)−1 or less.

At this time, the syntax element, entry_point_offset_minus1[i]+1 to specify the number of num_entry_point_offsets means the offset regarding the ith entry point. The slice segment data as per the slice segment header, in case num_entry_point_offsets specifies the number of entry point offsets in the slice segment, may consist of num_entry_point_offsets+1 substreams.

The substream index to specify the substream in the slice segment may have a value equal to or larger than 0 and equal to or less than num_entry_point_offsets.

Assuming that the first byte of the slice segment data is 0 (byte 0), substream 0 that is the 0th substream may consist of bytes eaual to or less than entry_point_offset_minus1[0] of the slice segment data.

Accordingly, if the kth substream consists of bytes equal to or larger than iniByte[k] and equal to or less than finByte[k] of the slice segment data, iniByte[k] and finByte[k] may be defined as shown in Equation 1.

$$intByte[k] = \Sigma entry\_point\_offset\_minus1[i]+1 \quad <\text{Equation 1}>$$

$$finByte[k] = iniByte[k] + entry\_point\_offset\_minus1[k]$$

In Equation 1, entry_point_offset_minus1[i] is summed from i=0 to i=k−1.

In case the WPP applies, the number of substreams (i.e., num_entry_point_offsets+1) is rendered to be the same as the number of LCU rows in the slice segment.

For ease of description, in Table 1, the number of entry point offsets is transmitted simply in the slice header. However, as set forth above, the slice header carrying the number of entry point offsets may be a slice segment header.

Further, in Table 1 one indicator indicates whether the tile applies and whether the WPP applies. In contrast, however, each of the syntax element as to whether the tile applies to perform parallel decoding and the syntax element as to whether the WPP applies may be transmitted. For example, whether to apply the WPP may be transmitted through a flag.

Table 2 simply shows an example in which the information regarding the number of entry point offsets described above in connection with Table 1 is transmitted in the slice segment header.

TABLE 2

| slice segment header( ) { | Descriptor |
|---|---|
| ... | |
| if( tiles enabled flag \| \| entropy_coding_sync_enabled_flag) { | |
| num_entry_point_offsets | ue(v) |
| ... | |

In Table 2, tiles_enabled_flag being 1 indicates that the tile may apply, and entropy_coding_sync_enabled_flag being 1 indicates that the WPP applies.

In case the tile or WPP applies, the number of entry point offsets in the slice segment header may be transmitted. num_entry_point_offsets specifies the number of entry point offsets in the slice segment header, and the number of entry points in the slice segment header is the number of entry point offsets in the slice segment header+1.

In case the number of substreams is maximized, i.e., when the number of substreams is the same as the number of LCU rows or when the number of substreams is the same as the entry points, the number of substreams or the number of LCU rows may be specified through the number of entry points (the number of entry point offsets) transmitted in the slice header or slice segment header.

Embodiment 2—Transmit Information to Indicate Whether LCU is Reordered

In embodiment 2, the information to indicate whether the LCU is reordered is signaled from the encoding apparatus to the decoding apparatus. For example, whether the LCU (CTU) is reordered may be indicated through ctb_reordering_flag.

In case ctb_reordering_flag is false, the information to indicate the number of substreams (for example, num_substream_minus1) is not present in the PPS. The number of substreams in the slice is the same as the number of entry points. That is, the value to be indicated by num_substream_minus1 is estimated to be the same as the value of the entry point offset, i.e., the value indicated by num_entry_point_offsets.

If ctb_reordering_flag is true, the information to indicate the number of substreams (for example, num_substream_minus1) is present in the PPS.

Regardless of whether the LCU is reordered, both the picture coded in a single WPP substream and the picture coded in a multi-WPP substream may be decoded using a single processing core or a multi-processing core. However, there may be a difference in ease-to-decode.

For example, if ctb_reordering_flag is false, it is determined that use of a single processing core is better in decoding the bit stream. Further, if ctb_reordering_flag is true, it may be determined that use of a multi-processing core is better in decoding the bit stream.

Table 3 shows an example of a PPS varied according to the present invention.

TABLE 3

| pic_parameter_set_rbsp( ) { | Descriptor |
|---|---|
| ... | |
|     if( tiles_or_entropy_coding_sync_idc = = 1 ) { | |
|     ... | |
|     } else if( tiles_or_entropy_coding_sync_idc = = 2) | |
|         ctb_reordering_flag | u(1) |
|         if (ctb_reordering_flag) | |
|             num_substreams_minus1 | ue(v) |
| ... | |
| } | |

In Table 3, tiles_or_entropy_coding_sync_idc being 1 indicates that the tile applies, and tiles_or_entropy_coding_sync_idc being 2 indicates that the WPP applies.

ctb_reordering_flag being 1 indicates that there is a syntax element to indicate the number of substreams (for example, num_substreams_minus1), and the coded tree blocks in the bit stream might not be ordered in the raster scan order. ctb_reordering_flag being 0 indicates that there is no syntax element to indicate the number of substreams (for example, num_substreams_minus1) and that the coded tree blocks in the bit stream is ordered in the raster scan order.

When ctb_reordering_flag is 0, the number of substreams in the slice is the same as the number of entry points, and the number of entry points may be specified by the number of entry point offsets. For example, the number of entry points may be the number of entry point offsets+1.

Besides, a variation may be made to the syntax element, num_entry_point_offsets, to indicate the number of entry point offsets in the slice header.

For example, num_entry_point_offsets transmitted in the slice header specifies the number of entry point offsets in the slice header. In case the tile applies (tiles_or_entropy_coding_sync_idc==1), the number of entry point offsets may be the number of tile rows not less than 0 (num_tile_coulmn_minus1+1)*the number of tile rows (num_tile_row_minus1+1)−1 or less.

Further, in case the WPP applies (tiles_or_entropy_coding_sync_idc==2) and ctb_reordering_flag is 1, the number of entry point offsets may be rendered to be the number of substreams not less than 0−1 (num_substreams_minus1).

Further, if the WPP applies (tiles_or_entropy_coding_sync_idc==2) and ctb_reordering_flag is 0, the number of entry point offsets may be the picture's LCU unit height −1 not less than 0 (PicHeightInCtbs−1) or less.

In case num_entry_point_offsets is not present, num_entry_point_offsets may be estimated to be 0.

Figure 12:
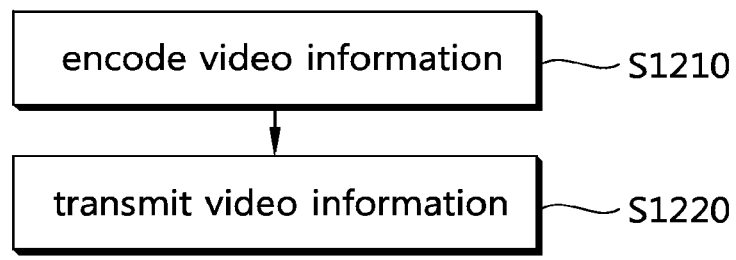
FIG. 12 is a flowchart schematically illustrating a video encoding method according to the present invention.

FIG. 12 is a flowchart schematically illustrating a video encoding method according to the present invention.

Referring to FIG. 12, the encoding apparatus encodes an input video (S1210). The specific video encoding method performed by the encoding apparatus has been described above in connection with FIG. 1. At this time, the encoding apparatus may encode in parallel the substreams that are LCU (Largest Coding Unit) rows.

In case the WPP applies, after encoding on the nth (n is an integer) substream is done, encoding on the second CTU or LCU of the nth substream is complete, and then, encoding on the n+1th substream may be performed.

For example, in the case of entropy-coding, if the entropy-coding on the second LCU of the nth substream is complete, the first LCU of the n+1th substream may be entropy-coded based on the context information on the second LCU of the nth substream.

At this time, in the picture, the number of substreams in the slice or slice segment is the same as the number of LCU rows.

Further, the number of substreams in the slice or slice segment may be the same as the number of entry points. At this time, the number of entry points may be specified by the number of entry point offsets. For example, the number of entry points may be the number of entry point offsets+1.

The encoding apparatus may signal the encoded video information in the bit stream (S1220). At this time, the bit stream may contain information to specify the number of entry point offsets. The information to specify the number of entry point offsets may be transmitted in the PPS, slice header, or slice segment header.

In case the number of substreams is maximized, a bit for byte-basis alignment may be added to the last part of each substream so that byte-basis aligning may be conducted on a per-substream basis.

Meanwhile, when the number of substreams is maximized, the access point of each substream may be specified by the entry point. For example, the access point of the second substream may be the point obtained by adding the entry point offset to the first entry point.

Figure 13:
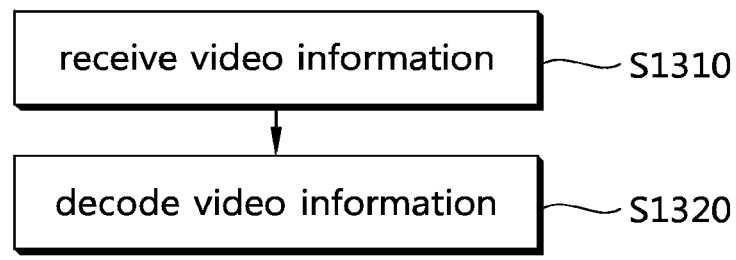
FIG. 13 is a flowchart schematically illustrating a video decoding method according to the present invention.

FIG. 13 is a flowchart schematically illustrating a video decoding method according to the present invention.

Referring to FIG. 13, the decoding apparatus receives the video information through the bit stream (S1310). The bit stream includes the substreams that are LCU (Largest Coding Unit) rows. Further, the bit stream may contain information to specify the number of entry point offsets. The information to specify the number of entry point offsets may be transmitted in the PPS, slice header, or slice segment header.

In the picture, the number of substreams in the slice or slice segment is equal to the number of LCU rows.

Further, in the picture, the number of substreams in the slice or slice segment may be the same as the number of entry points. At this time, the number of entry points may be specified by the number of entry point offsets. For example, the number of entry points may be the number of entry point offsets+1.

Meanwhile, in case the number of substreams is maximized, a bit for byte alignment may be added to the last part of each substream so that byte-basis aligning is performed on a per-substream basis.

The decoding apparatus may decode the received video information (S1320). At this time, the decoding apparatus may perform parallel decoding per tile or per substream.

For example, in case the WPP applies, after decoding on the nth (n is an integer) substream is done, decoding on the second CTU or LCU of the nth substream is complete and then decoding on the n+1th substream may be performed.

For example, in the case of entropy-decoding, if entropy-decoding on the second LCU of the nth substream is complete, related context information is stored, and the first LCU of the n+1th substream may be entropy-decoded based on the context information on the second LCU of the nth substream.

In case the number of substreams is maximized, the access point of each substream may be specified by the entry point. For example, the access point of the second substream may be the point obtained by adding the entry point offset to the first entry point.

In the above-described example system, the methods are described based on the flowcharts with a series of steps or blocks, but the present invention is not limited to the order of the steps, and rather, some steps may be performed simultaneously or in different order with other steps. Further, the above-described embodiments include various aspects of examples.

Accordingly, the present invention includes all other changes, modifications, and variations belonging to the following claims.

In the above description of the present invention, when an element is "connected to" or "coupled to" another element, it should be appreciated that the element may be directly connected to or coupled to the other element, or other elements may intervene therebetween. In contrast, when an element is "directly connected to" or "directly coupled to" another element, it should be understood that there is no intervening element therebetween.

The invention claimed is:

1. A video decoding apparatus, comprising:
a decoder configured to receive a bitstream including information on a slice header and information on substreams for a current slice segment, to obtain entry point information for the substreams from the slice header, and to decode the substreams based on the entry point information to reconstruct a picture;
a memory configured to store the reconstructed picture, wherein the decoder comprises:
an entropy decoding module configured to derive prediction information and residual information on a block of a current substream;
a prediction module configured to derive prediction samples on the block based on the prediction information;
an inverse transform module configured to derive residual samples on the block, wherein the residual samples are derived based on the residual information;
a reconstructed block generating unit configured to generate reconstructed samples to generate the reconstructed picture based on the prediction samples and the residual samples,
wherein the picture includes multiple largest coding units (LCUs),
wherein a number of the substreams is equal to a number of LCU rows in the current slice segment in the picture,
wherein the entry point information includes number information indicating a number of entry point offsets, and
wherein the number of the substreams is derived based on the number information in the slice header.

2. The video decoding apparatus of claim 1, wherein the decoder initiates decoding on a first LCU of the current substream based on context information on a second LCU of a previous substream after decoding on the second LCU of the previous substream is complete.

3. The video decoding apparatus of claim 1, wherein decoding on a n-th substream is initiated after decoding on a first two LCUs of (n−1)-th substream is complete.

4. The video decoding apparatus of claim 1, wherein an entry point indicates a first bit of a corresponding substream, wherein an entry point offset specifies a number of bytes between two entry points.

5. The video decoding apparatus of claim 1, wherein the substreams are substreams for wavefront parallel processing (WPP).

6. The video decoding apparatus of claim 1, wherein the number of the substreams is equal to the number of the entry point offsets plus one.

7. A video encoding apparatus, comprising:
an encoder configured to encode substreams for a current slice segment in a picture, and to generate a bitstream including information on a slice header and information on substreams for the current slice segment, wherein the slice header includes entry point information for the sub streams,
wherein the picture includes multiple largest coding units (LCUs),
wherein a number of the substreams is equal to a number of LCU rows in the current slice segment in the picture,
wherein the entry point information includes number information indicating a number of entry point offsets, and
wherein the number of the substreams is derived based on the number information in the slice header.

8. The video encoding apparatus of claim 7, wherein an entry point indicates a first bit of a corresponding substream, wherein an entry point offset specifies a number of bytes between two entry points.

9. The video encoding apparatus of claim 7, wherein the substreams are substreams for wavefront parallel processing (WPP).

10. The video encoding apparatus of claim 7, wherein the number of the substreams is equal to the number of the entry point offsets plus one.

11. A non-transitory decoder-readable storage medium storing a bitstream comprising a decoder executable program, the decoder executable program, when executed, causing a decoder to perform the following steps:
obtaining entry point information for substreams from a slice header, wherein the bitstream including information on the slice header and information on the substreams for a current slice segment,
decoding the substreams based on the entry point information to reconstruct a picture;
wherein decoding the substreams includes:
deriving prediction information and residual information on a block of a current substream;
deriving prediction samples on the block based on the prediction information;
deriving residual samples on the block, wherein the residual samples are derived based on the residual information;
generating reconstructed samples to generate the reconstructed picture based on the prediction samples and the residual samples,
wherein the picture includes multiple largest coding units (LCUs),
wherein a number of the substreams is equal to a number of LCU rows in the current slice segment in the picture,
wherein the entry point information includes number information indicating a number of entry point offsets, and
wherein the number of the substreams is derived based on the number information in the slice header.

12. The non-transitory decoder-readable storage medium of claim 11, wherein an entry point indicates a first bit of a corresponding substream,
wherein an entry point offset specifies a number of bytes between two entry points.

13. The non-transitory decoder-readable storage medium of claim 11, wherein the substreams are substreams for wavefront parallel processing (WPP).

14. The non-transitory decoder-readable storage medium of claim 11, wherein the number of the substreams is equal to the number of the entry point offsets plus one.

* * * * *